US005412153A

United States Patent [19]

Saito

[11] Patent Number: 5,412,153

[45] Date of Patent: May 2, 1995

[54] ELECTRONIC MUSICAL INSTRUMENT HAVING INDEPENDENT PITCH CONTROL FOR EACH KEY

[75] Inventor: Tsutomu Saito, Shizuoka, Japan

[73] Assignee: Kabushiki Kaisha Kawai Gakki Seisakusho, Hamamatsu, Japan

[21] Appl. No.: 166,565

[22] Filed: Dec. 13, 1993

Related U.S. Application Data

[63] Continuation-in-part of Ser. No. 981,466, Nov. 25, 1992, abandoned.

[51] Int. Cl.[6] .......... G10H 7/00; G10H 5/00; H02M 5/00

[52] U.S. Cl. .......... 84/619; 84/657; 84/445; 84/451

[58] Field of Search .......... 84/442, 445, 451, 454, 84/455, 477 R, 478, 615, 619, 653, 657, 678, DIG. 18

[56] References Cited

U.S. PATENT DOCUMENTS

| | | | |
|---|---|---|---|
| 3,968,719 | 7/1976 | Sanderson | 84/454 R |
| 4,566,364 | 1/1986 | Katoh | 84/625 |
| 4,635,517 | 1/1987 | Nagashima et al. | |
| 4,724,736 | 2/1988 | Isozaki | |
| 4,915,007 | 4/1990 | Wachi et al. | 84/622 |
| 4,947,724 | 8/1990 | Hirano et al. | 84/631 |
| 5,117,727 | 6/1992 | Matsuda | 84/619 |

*Primary Examiner*—William M. Shoop, Jr.
*Assistant Examiner*—Jeffrey W. Donels
*Attorney, Agent, or Firm*—Joseph C. Mason, Jr.; Ronald E. Smith

[57] ABSTRACT

Disclosed is a tone generating apparatus which is provided with a timbre select switch to specify a timbre and a scan circuit for generating key codes corresponding to keys. Pitch control values corresponding to the timbres and key codes are stored in the form of a pitch control table in a ROM. When a predetermined key is depressed, a pitch control value specified by the key code associated with that key and the timbre selected by the timbre select switch is read out from the pitch control table in the ROM, and a tone frequency is determined by the pitch control value and key code. Tone generation is controlled based on the tone frequency.

A pitch control value read out from the pitch control table in the ROM is given a predetermined offset to produce a musical tone having vibrato.

Further, a pitch control value read out from the pitch control table in the ROM is multiplied by a value specified by an operation panel to alter the degree of adding the pitch.

17 Claims, 12 Drawing Sheets

ELECTRONIC MUSICAL INSTRUMENT HAVING INDEPENDENT PITCH CONTROL FOR EACH KEY

This application is a continuation-in-part of application Ser. No. 07/981,466, filed Nov. 25, 1992, now abandoned.

BACKGROUND OF THE INVENTION

1. Field of the Invention

The present invention relates to a tone generating apparatus for use in electronic musical instruments, such as a synthesizer, and electronic piano and an electronic organ, and more particularly, to a tone generating apparatus capable of executing pitch control in accordance with timbres.

2. Description of the Prior Art

There is a conventional electronic musical instrument which can selectively use a plurality of pitches.

For instance, Japanese Patent Laid-open No. 60-178493 discloses an electronic musical instrument capable of freely setting the pitch for each pitch name within one octave.

According to the disclosed electronic musical instrument, a pitch control value for alteration of the pitch is the amount of off pitch from the temperament expressed in terms of a cent value. The pitch control value is given from an operation panel.

As frequency numbers (values proportional to tone frequencies: hereinafter called "F numbers") used in a tone generating apparatus, there are only twelve pieces of data, C, C#, D, D#, E, F, F#, G, G#, A, A# and B, in the temperament.

In generating a musical tone, any one of the twelve pieces of data is multiplied by a predetermined value (frequency ratio) corresponding to a cent value as a pitch control value. Then, the pitch altered by the multiplication is accumulated. The result of the accumulation is shifted to a range according to octave information. Through the above operation, a musical tone with the desired pitch will be generated.

According to this electronic musical instrument, when the pitch control value is zero, for example, the predetermined value (frequency ratio) is "1.00000" and the stored temperament F number can be used directly. If otherwise, the corresponding temperament F number is multiplied by a predetermined value (e.g., "1.00579" for +10 cents).

The electronic musical instrument with the above structure has the following shortcomings.

(1) While pitch control is commonly possible for the same pitch name within each octave, independent pitch control for each octave or independent pitch control for all the keys is not possible.

(2) Since there are twelve pieces of F number information (C, C#, D, . . . , A# and B), the capacity of the ROM which stores this information needs to be small. It is however necessary to provide a multiplier of about 16 bits by 16 bits to compute the cent offset, thus enlarging the hardware.

Japanese Patent Laid-open No. 61-194497 filed by the present applicant discloses a technique of selecting independent pitches in accordance with timbre parts.

As this technique cannot permit the selected pitch to be divided into finer pitches within a half tone for finer designation, the pitch data cannot be subjected to frequency modulation, such as vibrato.

Although independent pitches can be selected in accordance with timbre parts, it is a player who makes the selection and it is difficult even for skilled persons to select the desired timbre during a musical performance and simultaneously select the optimal pitch for that timbre.

The "pitch" in the above prior art is concerned with a so-called pitch theory, and it is determined to which one of typical pitches, for example, the temperament, pure temperament and Pythagorean pitch, the pitch in question is close for each timbre part.

Actually, however, individual instruments have their own unique pitches. In the case of a piano, for instance, the pitch-octave relation that the pitch is doubled between adjoining octaves is not fulfilled, but pitch setting with a so-called S curve is carried out so that a lower pitch is set in a high-pitch range while a higher pitch is set in a low-pitch range. It is therefore difficult to associate the S-curved pitch setting with existing, limited pitches.

SUMMARY OF INVENTION

It is therefore a primary object of the present invention to provide a tone generating apparatus capable of effecting independent pitch control for every key in accordance with the timbre even with a small scale of hardware.

It is another object of the present invention to provide a tone generating apparatus capable of executing independent pitch control of every key in accordance with the timbre and modulating the tone frequency.

It is a further object of the present invention of provide a tone generating apparatus which can alter the degree of pitch control for every key in accordance with the timbre or timbre parts, thus ensuring finer pitch control.

To achieve the first object, a tone generating apparatus according to the present invention is provided, comprising:

- timbre designating means for designating a timbre;
- key code generating means for generating a key code in accordance with a pitch;
- storage means for storing pitch control information associated with each key code to be generated by the key code generating means for each timbre designated by the timbre designating means; and
- control means for, when tone generation at a predetermined pitch is instructed, reading out pitch control information, specified by that key code generated by the key code generating means in accordance with the instruction and the timbre designated by the timbre designating means, from the storage means and determining a tone frequency based on the pitch control information and the key code to thereby perform tone generation control.

According to the first aspect of the present invention, pitch control information prepared in association with key codes according to the timbre and pitch for every key is stored in advance in the storage means, and when tone generation is instructed, musical tones are generated while correcting the pitch by referring to the pitch control information. This arrangement permits independent pitch control for every key in accordance with the timbre even with a small scale of hardware.

To achieve the second object, a tone generating apparatus according to the present invention is provided, comprising:

- timbre designating means for designating a timbre;

key code generating means for generating a key code in accordance with a pitch;

modulation designating means for designating modulation of a tone frequency;

storage means for storing pitch control information associated with each key code to be generated by the key code generating means for each timbre designated by the timbre designating means; and control means for, when tone generation at a predetermined pitch is instructed, reading out pitch control information, specified by that key code generated by the key code generating means in accordance with the instruction and the timbre designated by the timbre designating means, from the storage means, performing an operation on the read pitch control information and modulation information of the tone frequency whose modulation is designated by the modulation designating means to prepare new pitch control information, and determining a tone frequency based on the new pitch control information and the key code to thereby perform tone generation control.

According to the second aspect of the present invention, pitch control information prepared in association with key codes according to the timbre and pitch for every key is stored in advance in the storage means, means for designating modulation of a tone frequency, such as vibrato, is provided, and when frequency modulation is designated, an operation on the pitch control information and the frequency modulation information is performed to provide new pitch control information and musical tones are generated while correcting the pitch by referring to the new pitch control information. This arrangement permits modulation of the tone frequency as well as independent pitch control for every key in accordance with the timbre.

To achieve the third object, a tone generating apparatus according to the present invention is provided, comprising:

timbre designating means for designating a timbre;

key code generating means for generating a key code in accordance with a pitch;

storage means for storing pitch control information associated with each key code to be generated by the key code generating means for each timbre designated by the timbre designating means;

pitch designating means for designating pitch control information to be arithmetically combined with the pitch control information stored in said storage means; and control means for, when tone generation at a predetermined pitch is instructed, reading out pitch control information, specified by that key code generated by the key code generating means in accordance with the instruction and the timbre designated by the timbre designating means, from the storage means, altering the pitch control information by arithmetically combining it with the pitch control information designated by the pitch designating means, and determining a tone frequency based on the altered pitch control information and the key code to thereby perform tone generation control.

According to the third aspect of the present invention, pitch control information prepared in association with key codes according to the timbre and pitch for every key is stored in advance in a pitch control information table means for designating pitch control information is provided, and when the pitch control information is designated, the pitch control information in the table is changed in accordance with that designated information. This arrangement allows for alteration of the degree of pitch control in accordance with the timbre or timbre parts for every key, thereby ensuring finer pitch control.

DETAILED DESCRIPTION OF THE PREFERRED EMBODIMENT

Figure 1:
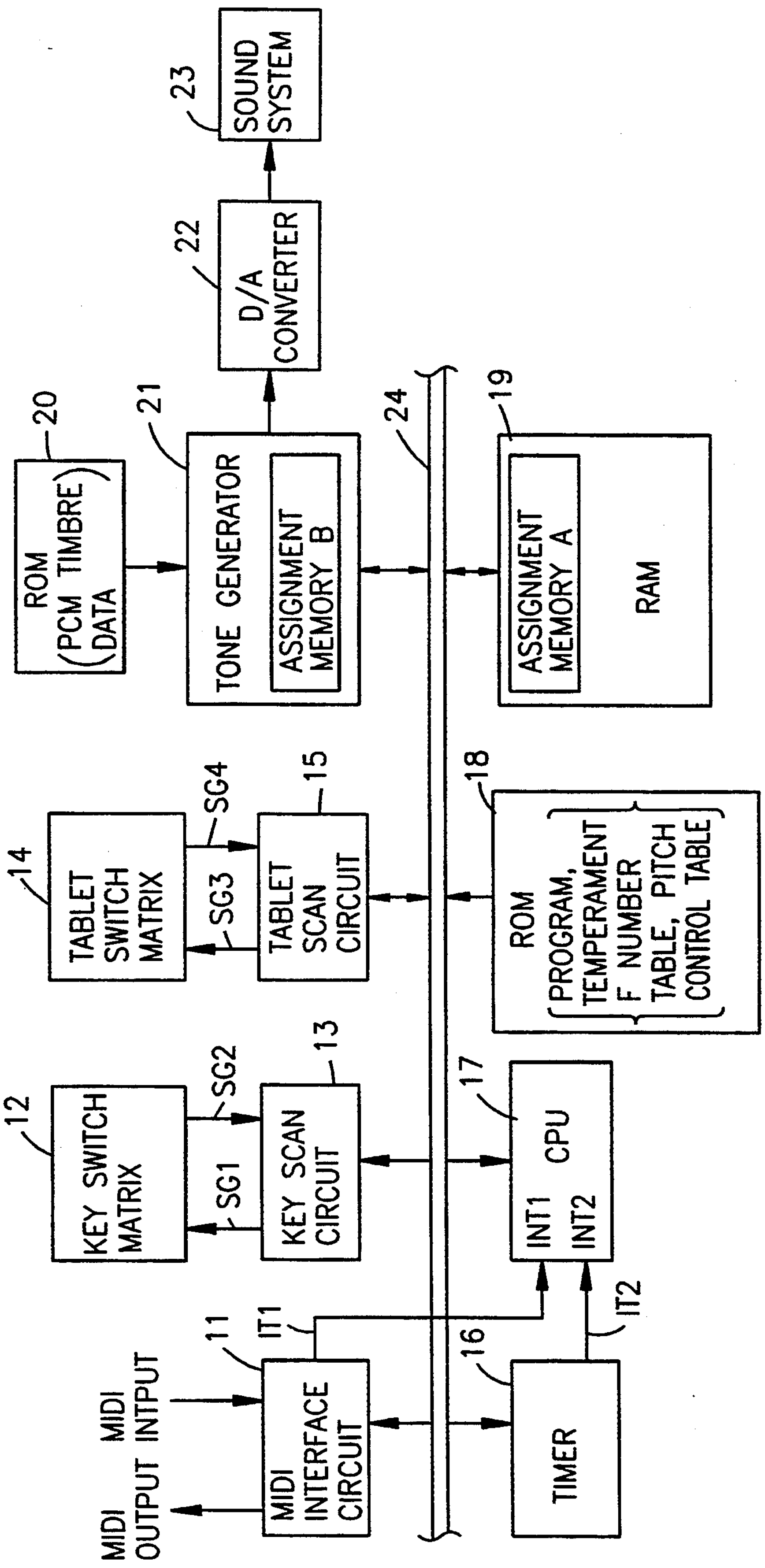
FIG. 1 is a block diagram illustrating the structure of one embodiment of the present invention.

FIG. 1 is a schematic block diagram showing the general structure of a tone generating apparatus according to one embodiment of the present invention.

Referring to FIG. 1, a MIDI (Musical Instrument Digital Interface) interface circuit 11 exchanges tone information with an external device. The MIDI interface circuit 11 has a MIDI input to which a serial tone signal is input from the external device. The serial tone signal is converted into a parallel tone signal in the MIDI interface circuit 11 and supplied via a system bus 24 to a CPU 17. At this time, the CPU 17 is informed of the occurrence of the MIDI input by an interrupt signal (IT1) in addition to the tone signal.

The parallel tone signal output from the CPU 17 is supplied via the system bus 24 to the MIDI interface circuit 11 where it is converted into a serial tone signal. This serial tone signal is then supplied as an MIDI output signal to the external device.

A key switch matrix 12 has a matrix of key switches coupled to individual keys on a keyboard (not shown). The key switch matrix 12 is scanned by a key scan circuit 13.

The key scan circuit 13 outputs a scan signal SG1 to the key switch matrix 12 to scan it, and acquires a signal SG2 indicating the key depression status or key release status. This signal SG2 is sent via the system bus 24 to the CPU 17.

A tablet switch matrix 14 has a matrix of switches which are provided on an operation panel (not shown) and having functions to alter the timbre, effect, volume and so forth. This tablet switch matrix 14 is scanned by a tablet scan circuit 15.

The tablet scan circuit 15 outputs a scan signal SG3 to the tablet switch matrix 14 to scan it, and acquires a signal SG4 representing the ON/OFF status of each switch on the operation panel. This signal SG4 is sent via the system bus 24 to the CPU 17.

A presettable timer 16 has a built-in down counter. The CPU sets an arbitrary value to the down counter via the system bus 24. When the count value becomes "0" through the countdown operation, and interrupt signal IT2 is generated. This interrupt signal IT2 is sent to the CPU 17 to start an interruption process. A vibrato operation is performed in the interruption process initiated by the interrupt signal IT2.

The CPU 17 is constituted by, for example, a microprocessor. The CPU 17 is operated in accordance with a control program stored in ROM (Read Only Memory) 18 to control individual section of the tone generating apparatus.

The ROM 18 is constituted by an exclusive LSI (Large Scale Integrated Circuit) with a large memory capacity. A "temperament F number table" and "pitch control table" as well as the control program are stored in the ROM 18. The temperament F number table and the pitch control table will be described in detail later.

A RAM (Random Access Memory) 19 has status information of the tone generating apparatus, various registers, flags, a work area for the CPU 17, and an assignment memory A used for a tone-ON assignment. The details of the assignment memory A will be given later A ROM 20 like the ROM 18 is constituted by an exclusive LSI with a large memory capacity. PCM timbre data (wave data) to be supplied to a tone generator 21 is stored in the ROM 20.

The tone generator 21 generates digital tone signals in 16 channels in a time-shared manner, and outputs these tone signals grouped into four parts.

The reason for outputting the signals in four parts is to match with the 4-channel time-shared operation of a D/A converter 22 located at the subsequent stage. Depending on the arrangement of the D/A converter 22, it can be changed to output the signal by the various number of parts, besides four. The tone generator 21 has an assignment memory B inside. Key information for each channel which is assigned in the assignment memory A is converted into the F number information and is stored in the assignment memory B. The tone generator 21 and the assignment memory B will be explained in detail later.

The digital tone signal from the tone generator 21 is supplied to the D/A converter 22.

The D/A converter 22 converts the digital tone signals (sample values), which are grouped into four parts in the tone generator 21 and output in the time-shared manner, into analog tone signals of four systems and holds them. The analog signals converted by the D/A converter 22 are supplied to a sound system 23.

The sound system 23 amplifies the received analog tone signals, which are in turn converted into acoustic signals and released as sounds by acoustic generating means typified by a loudspeaker or a headphone.

The MIDI interface circuit 11, the key scan circuit 13, the tablet scan circuit 15, the timer 16, the CPU 17, the ROM 18, the RAM 19, and the tone generator 21 are connected to one another by the system bus 24.

Figure 2:
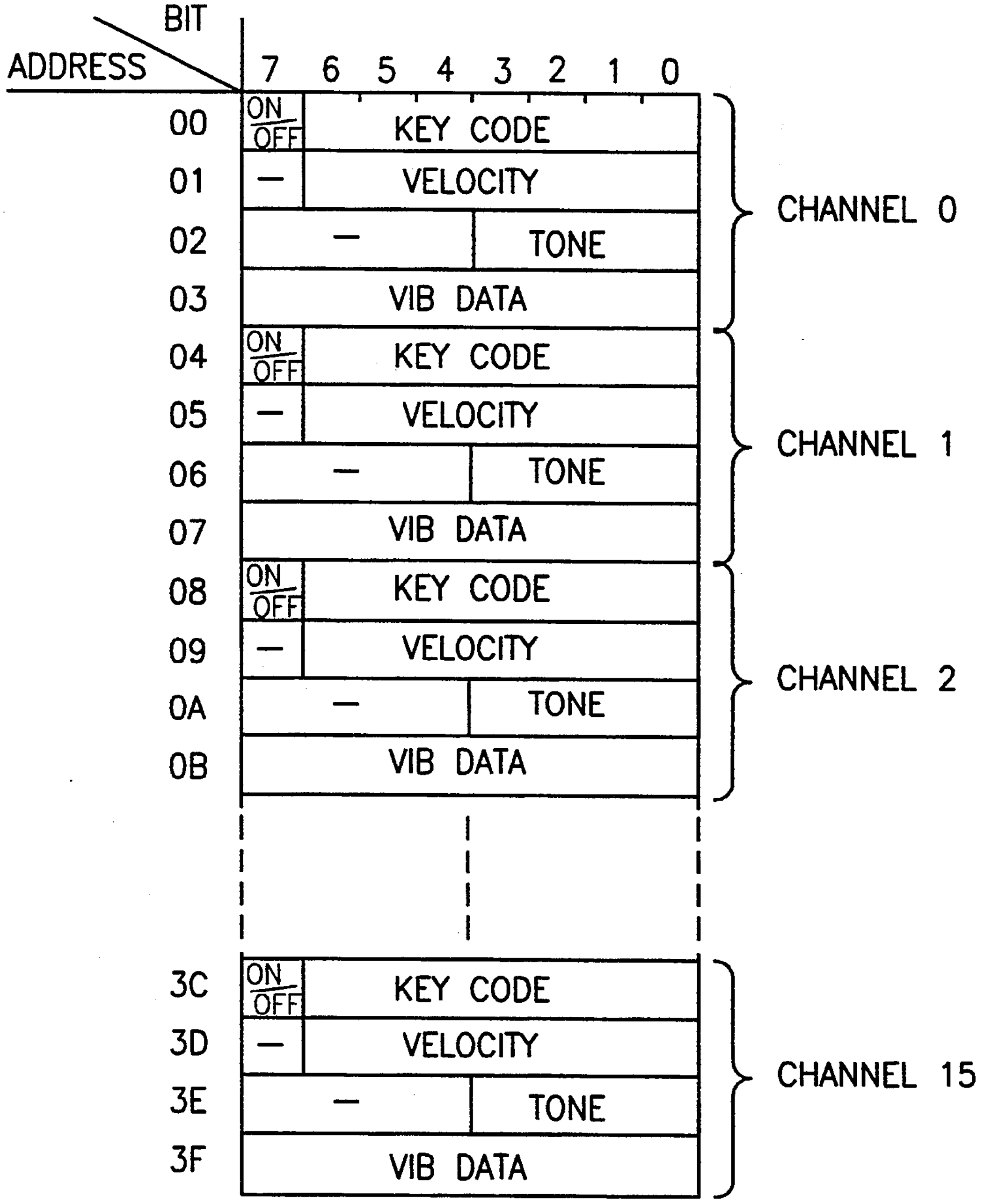
FIGS. 2 and 3 are diagrams showing the data storage formats in an assignment memory A according to this embodiment.
Figure 3:
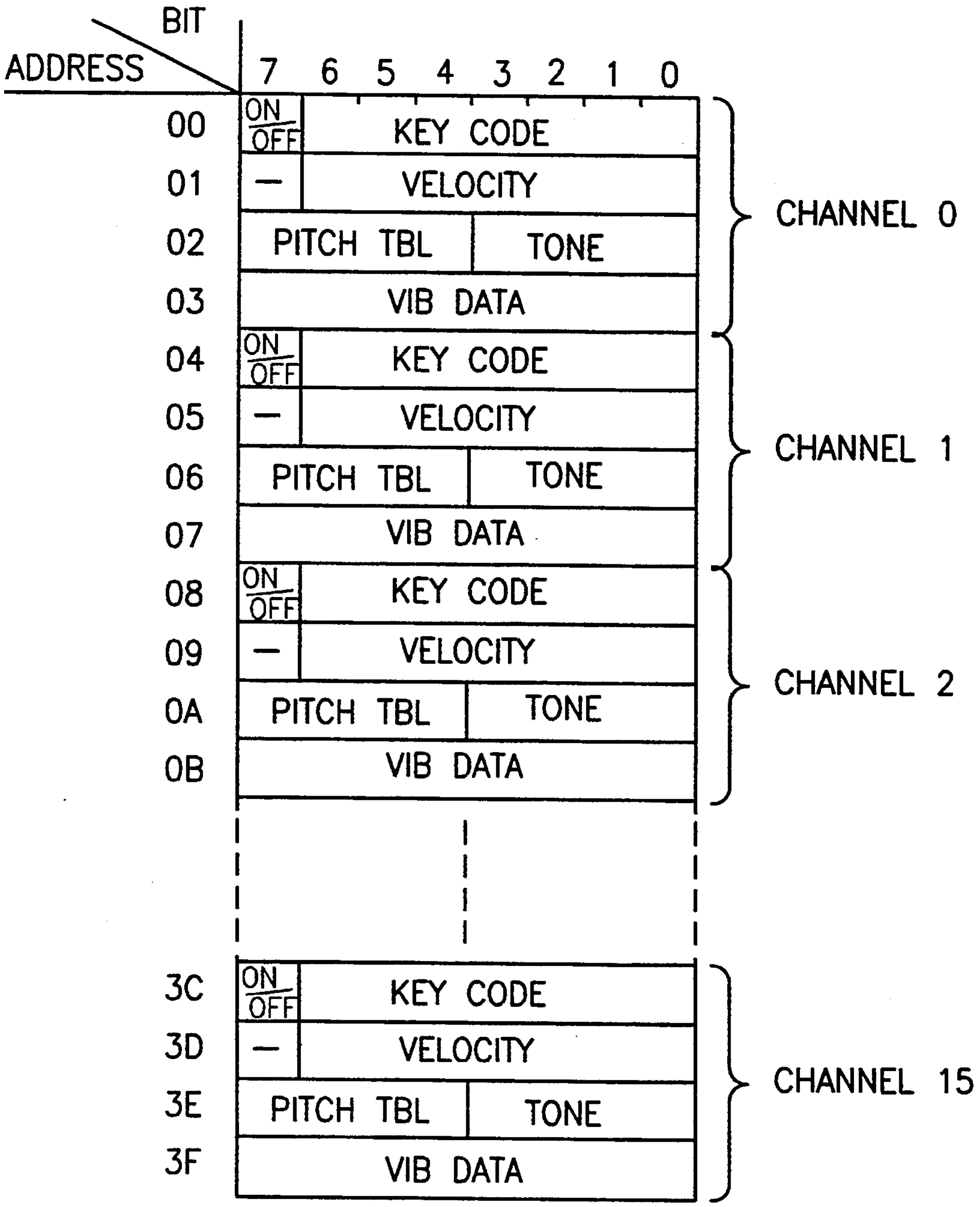

FIGS. 2 and 3 show data storage formats in the assignment memory A. The assignment memory A includes data for 16 channels (0 to 15 channels (CH)) which can simultaneously generate musical tones. Each piece of data corresponds to an address in the assignment memory A.

Data of each channel consists of four bytes. As shown in FIG. 2, an ON/OFF bit (bit7) indicating a key status and a key code (bit 6 to 0) indicating a key number are assigned to the first byte, and a velocity (bits 6 to 0) showing a key-depressing speed to the second byte, tone data (bits 3 to 0) to designate at which timbre the target channel will generate a musical tone to the third byte, and VIB data (7 to 0) to designate the current vibrato to the fourth byte. No data is assigned to bit 7 of the second byte and bits 7 to 4 of the third byte.

FIG. 3 shows an example where a "pitch TBL" that specified a pitch table is assigned to bits 7 to 4 of the third byte of the channel data shown in FIG. 2. A detailed explanation of the pitch table will be given later.

The key code and the velocity are the same as those specified in the MIDI interface specifications and each consist of 7 bits; the 8 bit VIB data is also the same.

Figure 4:
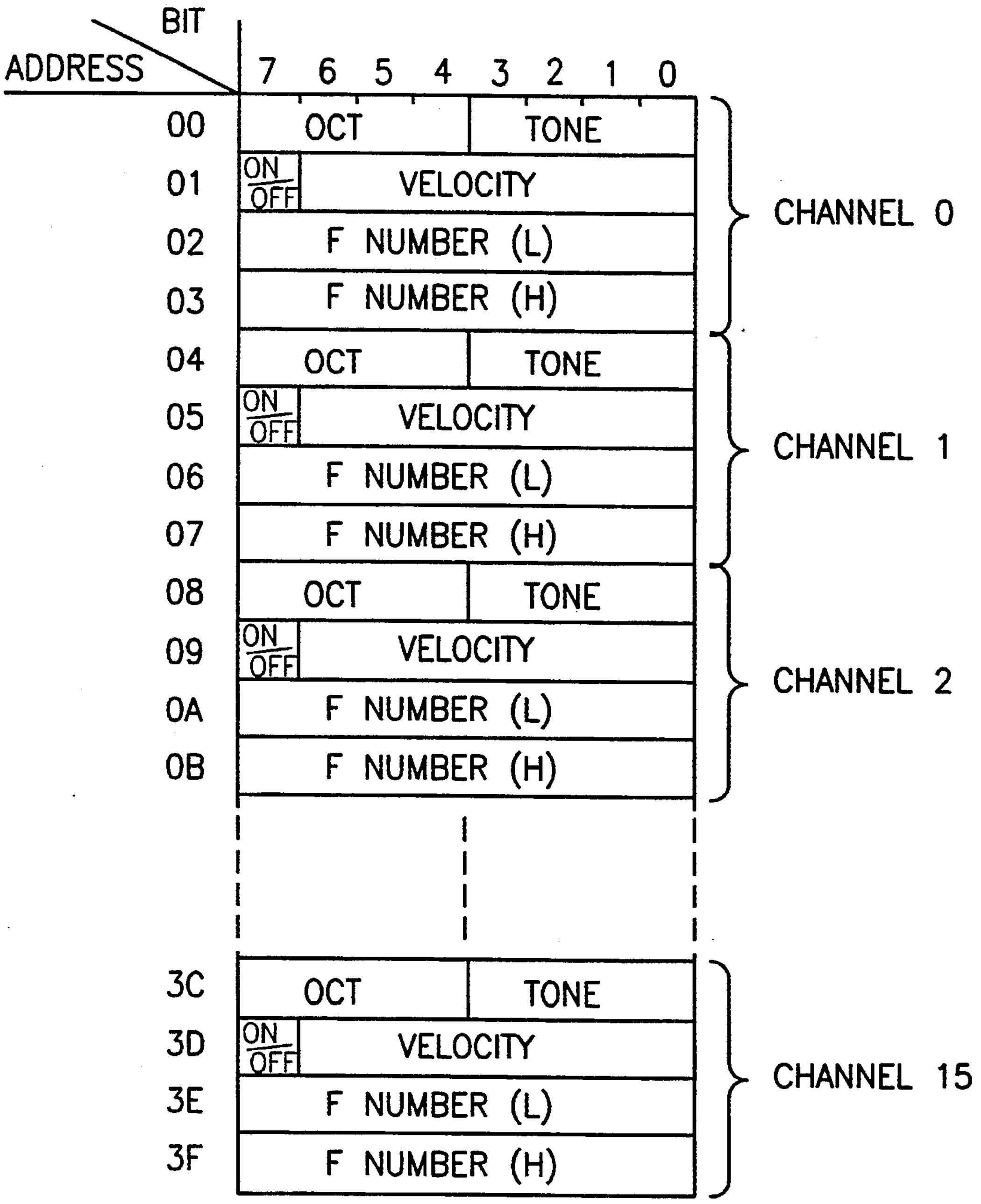
FIG. 4 is diagram showing the data storage format in an assignment memory B according to this embodiment.

FIG. 4 shows the data storage format in the assignment memory B. The assignment memory B includes data for 16 channels (0 to 15 CH) which can simultaneously generate musical tones. Each piece of data corresponds to an address in the assignment memory B.

Data of each channel consists of four bytes: and OCT (bits 7 to 4) indicating to which octave a key belongs and tone data (bits 3 to 0) to designate at which timbre the target channel will generate a musical tone are assigned to the first byte, and an ON/OFF bit (bit 7) indicating a key status and a velocity (bits 6 to 0) showing a key-depressing speed to the second byte, and 16-bit F number showing a read tone frequency to the third and fourth bytes. The third byte is the lower byte (L) of the F number, while the fourth byte is the upper byte (H).

Figure 5:
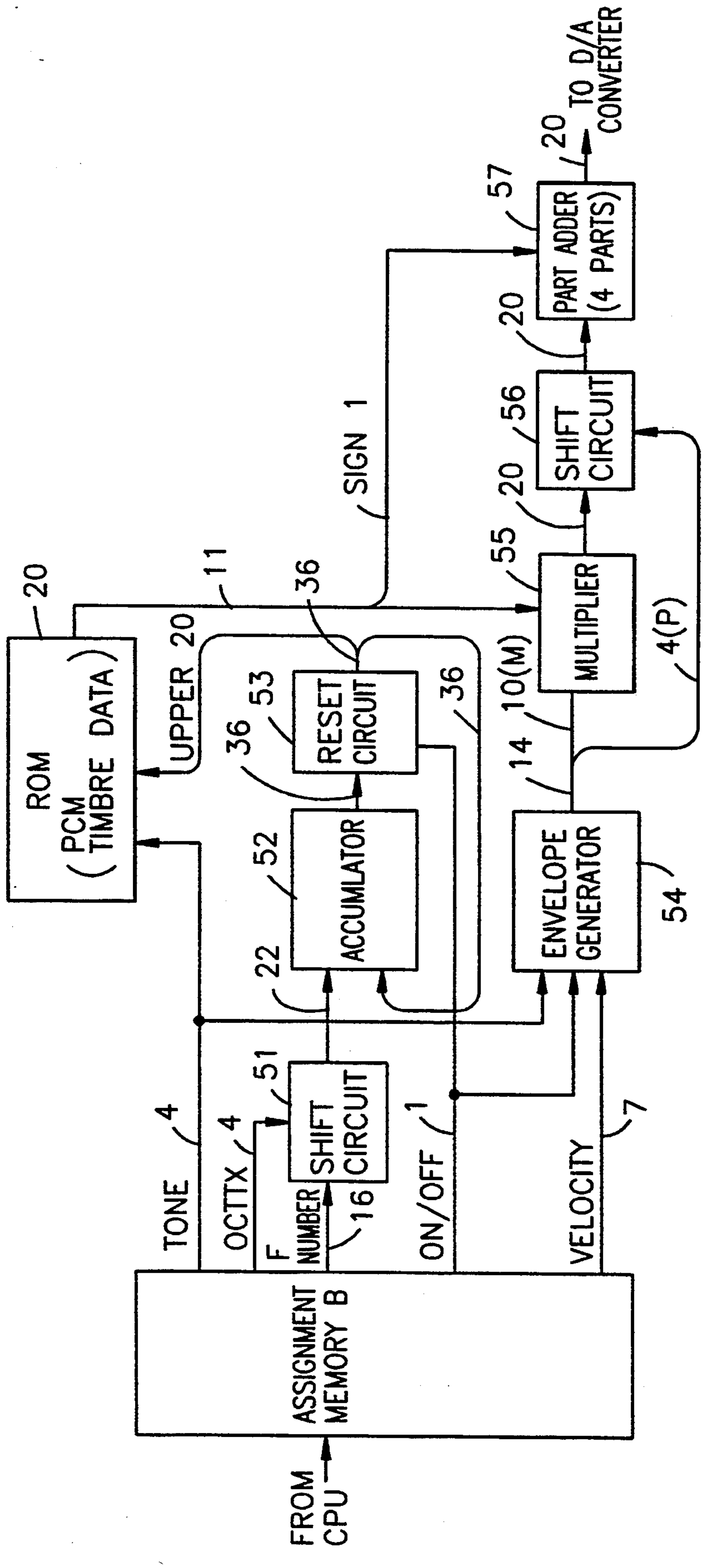
FIG. 5 is a detailed block diagram of a tone generator according to this embodiment.

FIG. 5 is a detailed block diagram of the tone generator 21.

The assignment memory B is the same as one already described referring to FIG. 1. The data formatted as shown in FIG. 4 is written via the system bus 24 into this assignment memory B by the CPU 17. The written data is read out in a 16-channel time-shared manner, and is supplied to individual circuits in the tone generator 21.

The ROM 20, which is likewise the same as has been described referring to FIG. 1, stores the PCM timbre data (wave data). To the ROM 20, 4-bit tone data is supplied as part of an address from the assignment memory B, and 20-bit data is supplied as the other part of the address from the reset circuit 53 to be described later. Desired timbre data (11 bits) is read out with a 20-bit address. The timbre data stored in the ROM 20 consists of a 1-bit sign and 10-bit number.

A shift circuit 51 shifts the F number data supplied from the assignment memory B in accordance with the OCT data sent also from the assignment memory B, and then outputs the shifted F number data. For example, if the F number is prepared in association with the OCT=4, the shift operation would be performed as shown in Table 1. The result of the data shifting done by the shift circuit 51 is sent as 22-bit data to an accumulator 52.

The accumulator 52 accumulates the received F number data in a 16-channel time-shared manner. The accumulator 52 therefore includes sixteen 36-bit registers and one adder. The 36-bit F number data output from the accumulator 52 in a 16-channel time-shared manner is supplied to the reset circuit 53.

TABLE 1

| OCT | Shift Operation |
|---|---|
| 0 | 4-bit shift down |
| 1 | 3-bit shift down |
| 2 | 2-bit shift down |
| 3 | 1-bit shift down |
| 4 | no shift |
| 5 | 1-bit shift up |
| 6 | 2-bit shift up |
| 7 | 3-bit shift up |
| 8 | 4-bit shift up |
| 9 | 5 bit shift up |
| A | 6-bit shift up |

In synchronism with the depression of a key on the keyboard, i.e., when the ON/OFF bit of the assignment memory changes from "0" to "1, " the reset circuit 53 forcibly clears the F number for a channel corresponding to the key. Those F numbers which are not associated with the key-ON action are returned to the accumulator 52, and are added with the F number sent from the shift circuit 51. The result is stored in the internal register of the accumulator 52. Thus, the accumulating function can be realized. The upper 20 bits of the output of the reset circuit 53 are sent to the ROM 20 to be used as part of the read address for wave data.

An envelope generator 54 receives the 4-bit tone data, the 1-bit ON/OFF data and the 7-bit velocity data from the assignment memory B, and generates envelope data (14 bits) in a 16-channel time-shared manner. The envelope generator 54 also includes 16 internal registers.

The 14-bit envelope data generated by the envelope generator 54 is data of a floating-point system. The upper 4 bits of the data consist of an index (P), and lower 10 bits consist of a mantissa (M). This 14-bit envelope data can express a value in a wide range. Among the 14-bit data, the 10-bit mantissa (M) is supplied to a multiplier 55, and the 4-bit index (P) is sent to a shift circuit 56.

The multiplier 55 multiplies 10-bit timbre data of tone data except for the sign bit, read out from the ROM 20, by the 10-bit mantissa (M) from the envelope generator 54, and outputs the multiplication result as 20-bit data. The output of the multiplier 55 is sent to the shift circuit 56.

The shift circuit 56 shifts down the multiplication result from the multiplier 55 in accordance with the index (P) output from the envelope generator 54. The shift-down operation is executed as indicated in Table 2.

TABLE 2

| Number (P) | Shift Operation |
|---|---|
| 0 | 15-bit shift down |
| 1 | 14-bit shift down |
| 2 | 13-bit shift down |
| 3 | 12-bit shift down |
| : | : |
| D | 2-bit shift down |
| E | 1-bit shift down |
| F | no shift |

A part adder 57 performs addition and subtraction to group sample data given in a 16-channel time-shared manner, into four parts, using its four internal registers. The part adder 57 performs addition or subtraction on the contents of each register and the 20-bit data from the shift circuit 56 in accordance with the 1-bit sign read out from the ROM 20, and outputs the result as 20-bit data. The values of the four internal registers are periodically cleared in a 16-channel time-shared manner. The output of this part adder 57 is supplied to the D/A converter 22 as described above.

Figure 6:
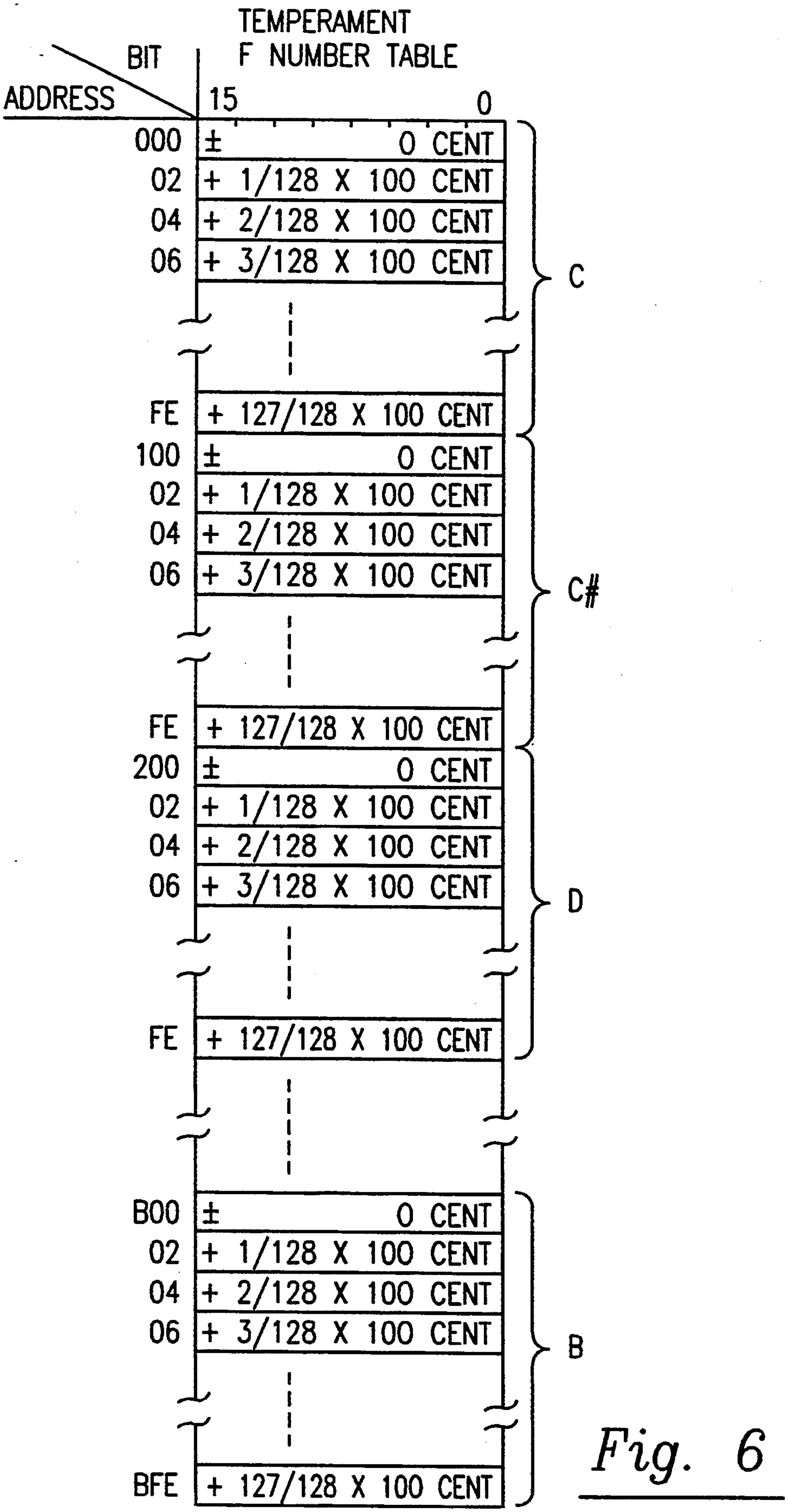
FIG. 6 is a diagram exemplifying an equal temperament number table according to this embodiment.

FIG. 6 exemplifies the equal temperament F number table stored in the ROM 18. Since this invention employs only one temperament F number table, those of ordinary skill in this art will understand that equal temperament is understood. This equal temperament F number table includes 12 half notes constituting one octave, each half note further divided in to 128 sub notes to provided the accuracy in the units of $(1/128)\times 100$ cents. It is therefore necessary to provide a memory with a capacity of 12 (half notes)$\times$128 (sub notes)=1536 words.

While each F number is treated as having a 16-bit structure according to this embodiment, the size may be altered as needed.

The values of the F number are prepared in light of which octave is taken as a reference, the reproduction sampling frequency, the number of time-shared channels, and the recording sampling frequency of the PCM timbre data stored in the ROM 20.

As every musician knows and as workers in this field know, (whether they are musicians or not) the major scale is divided into twelve half tones as follows:

C C# D D# E F F# G G# A A# B (there is no E# or B#)

FIG. 6 indicates said twelve half tones by brackets. Note the bracket labeled "C" followed by the bracket labeled "C#," etc. Note that the figure ends with "B" because there is no "B#," as aforesaid. Thus, FIG. 6 depicts the twelve half tones of the major scale. (Of course, the broken lines between "D" and "B" indicate that D#, E, etc. are not shown). This means that the major scale has been divided into twelve equal parts; thus, the temperaments produced therefrom are said to be equal temperaments.

FIG. 6 further discloses that, in this invention, each half tone is divided into 100 equal parts. Thus, the major scale is divided into 1200 equal parts. Significantly, each half tone (C, C#, etc.) is located at 100 "cent" intervals. Therefore, although the major scale is divided into 1200 equal "cents," the twelve half tones will be found at 100 "cent" intervals, i.e., C is located at address "100," C# is located at address "200" and so on. This is a highly innovative contribution to the art.

Figure 7:
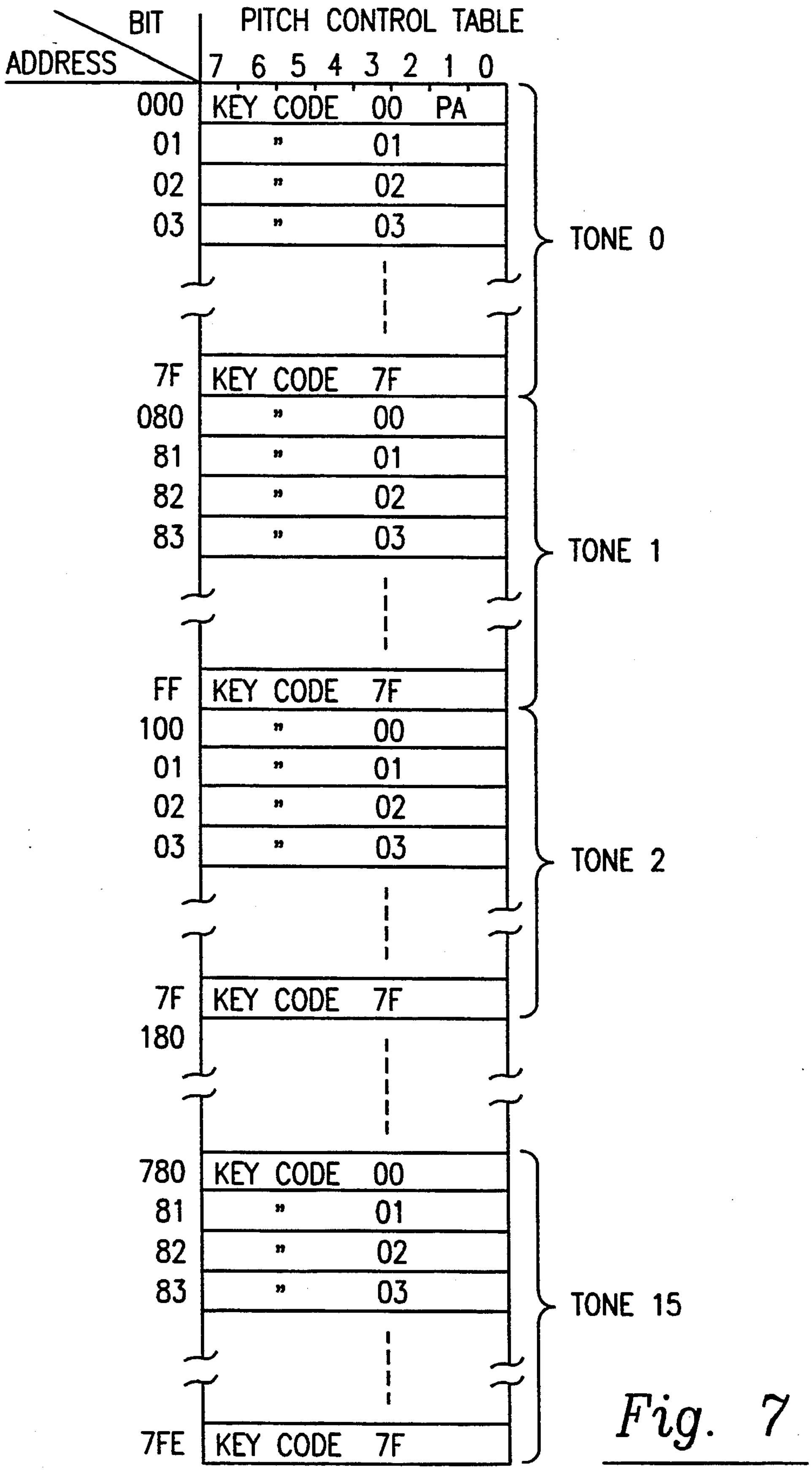
FIG. 7 is a diagram exemplifying a pitch control table according to this embodiment.

FIG. 7 illustrates a pitch control table provided in association with the individual timbres (tones). This pitch control table shows each timbre consisting of 0 to $7F_H$ or 128 bytes ("H" indicates a hexadecimal notation), with each address directly corresponding to the associated MIDI key code.

In consideration that actual keys to be used mostly are 62 keys from $24_H$ to $61_H$, the memory capacity may be reduced to a half by using a 36 ($=24_H$) bias addresses as shown in Table 3 below.

In this case, for key codes of below $24_H$, the same pitch control value for $24_H$ is used, while for key codes of $64_H$ and higher, the same pitch control value for $63_H$ is used.

| Address | Corresponding Note |
|---|---|
| $00_H$ | $24_H$ |
| $01_H$ | $25_H$ |
| $02_H$ | $26_H$ |
| $03_H$ | $27_H$ |

-continued

| Address | Corresponding Note |
|---|---|
| : | : |
| $3C_H$ | $60_H$ |
| $3D_H$ | $61_H$ |
| $3E_H$ | $62_H$ |
| $3F_H$ | $63_H$ |

While a pitch control value is provided in association with each key in FIG. 7 (as well as in the above Table 3), a single pitch control value may be associated with two keys, three keys or four keys.

In this case, it is desirable that the pitch control value to be obtained should be a value (interpolated value) between two pitch control values.

For instance, in the case of using a pitch control table having a single pitch control value for four keys as shown in the following Table 4, the target pitch control value is acquired from equation (1) below.

| Address | | Corresponding Note | | | | Pitch Control Value |
|---|---|---|---|---|---|---|
| $00_H$ | ≦ | $24_H$ | $25_H$ | $26_H$ | $27_H$ | $+38_H$ |
| $01_H$ | | $28_H$ | $29_H$ | $2A_H$ | $2B_H$ | $+30_H$ |
| $02_H$ | | $2C_H$ | $2D_H$ | $2E_H$ | $2F_H$ | $+28_H$ |
| $03_H$ | | $30_H$ | $31_H$ | $32_H$ | $33_H$ | $+20_H$ |
| $04_H$ | | $34_H$ | $35_H$ | $36_H$ | $37_H$ | $+18_H$ |
| $05_H$ | | $38_H$ | $39_H$ | $3A_H$ | $3B_H$ | $+10_H$ |
| $06_H$ | | $3C_H$ | $3D_H$ | $3E_H$ | $3F_H$ | $+08_H$ |
| $07_H$ | | $40_H$ | $41_H$ | $42_H$ | $43_H$ | $\pm 0_H$ |
| $08_H$ | | $44_H$ | $45_H$ | $46_H$ | $47_H$ | $-08_H$ |
| $09_H$ | | $48_H$ | $49_H$ | $4A_H$ | $4B_H$ | $-10_H$ |
| $0A_H$ | | $4C_H$ | $4D_H$ | $4E_H$ | $4F_H$ | $-18_H$ |

With the key code being $32_H$, for example, the pitch control value to be acquired is:

$$\begin{aligned} & 20_H + \{18_H - 20_H\} \times (3/4) \ldots (1) \\ = & 20_H + (-8_H) \times (3/4) \\ = & 20_H - 6_H \\ = & 1A_H \end{aligned}$$

Here, $20_H$ is what is stored a the address $03_H$, and $18_H$ is what is stored at the address $04_H$.

Figure 8:
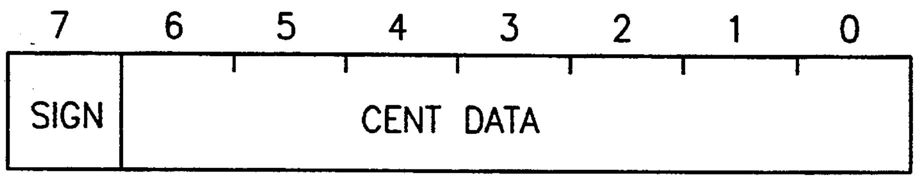
FIG. 8 is a diagram showing the data format of the pitch control table in FIG. 7.

The pitch control values stored in this pitch control table are each expressed by the sign and cent data as shown in FIG. 8. As the cent data consists of 7 bits, the control range is from $-(127/128)\times 100$ to $+(127/128)\times 100$ cents.

While the pitch control table in FIG. 7 illustrates the case where a table is provided for each timbre, it is actually possible to control the pitches of all the timbres referring to fewer pitch control tables than the number of the total timbres.

This can be realized by using the data storage format in the assignment memory A as shown in FIG. 3. In other words, the area "pitch TBL" is defined in the upper four bits of the third byte of each channel data, and a selection number indicating which of sixteen types of pitch TBLs should be selected is stored in the "pitch TBL" area.

With this arrangement, even if there are 256 types of tones (timbres), it is sufficient to provide sixteen types of pitch control tables.

Figure 9:
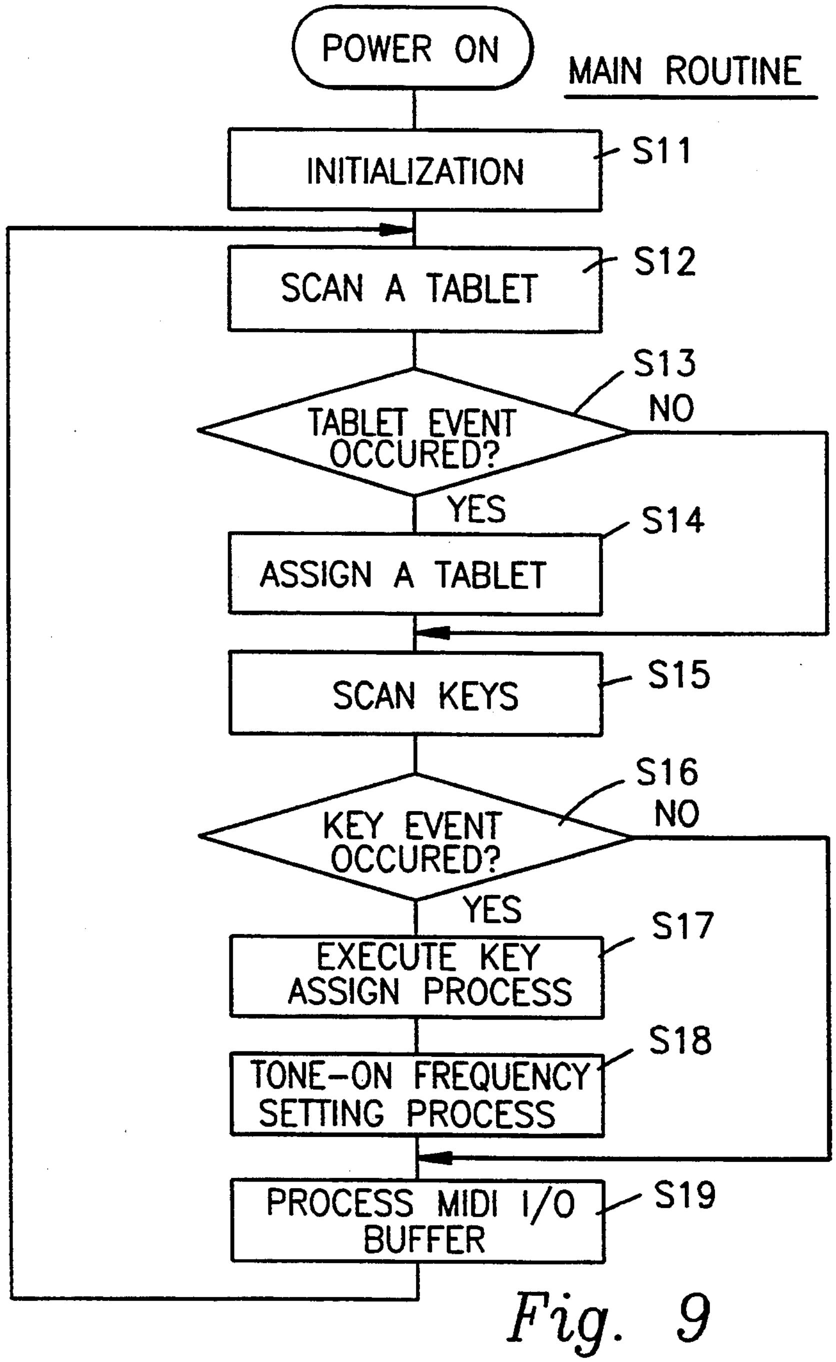
FIGS. 9 and 10 are flowcharts illustrating the operation of this embodiment.

FIG. 9 presents a flowchart illustrating the operation of the main routine of this embodiment of the present invention.

When the apparatus is powered on, first, the initialization is performed to set initial values to the RAM 19, the operation panel and the tone generator 21 (step S11).

When this initialization is completed, a tablet scan process is executed (step S12). In this process, the tables scan circuit 15 scans the tablet switch matrix 14 and fetches data about the set statuses of the tablet switches to the CPU 17. The tablet switches include a timbre select switch, a volume switch, a pitch control ratio switch (its details will be given later).

Then, the fetched data is analyzed to check if there is any tablet event (step S13). When it is judged that a tablet vent has occurred, a tablet assign process is performed (step S14).

In this tablet assign process, the proper pitch control ratio is selected. The tablet assign process may be omitted if no alteration of the pitch control ratio is necessary.

Figure 11:
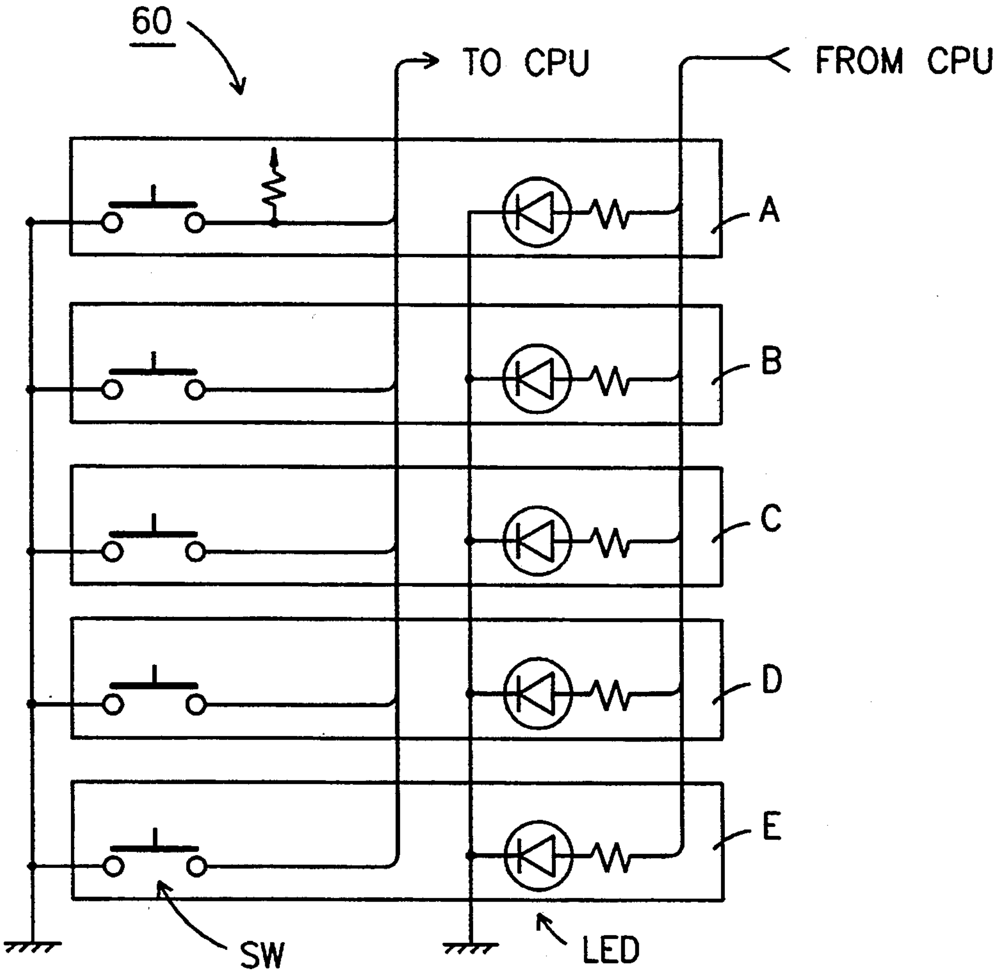
FIG. 11 is a circuit diagram illustrating the structure of a pitch control ratio switch according to this embodiment.

FIG. 11 illustrates the structure of a pitch control value switch 60 used in the selection of the proper pitch control ratio. This switch 60 comprises five modules A to E. Each module includes a switch SW constituting part of the tablet switch matrix 14 and a display LED associated with this switch SW.

In accordance with the selected status of the switches SW, one of the pitch control ratios 0/8 to 8/8 is selected as shown in Table 5 below. Table 5

TABLE 5

| E | D | C | B | A | Ratio |
|---|---|---|---|---|---|
| — | — | — | — | ON | 0/8 |
| — | — | — | ON | ON | 1/8 |
| — | — | — | ON | — | 2/8 |
| — | — | ON | ON | — | 3/8 |
| — | — | ON | — | — | 4/8 |
| — | ON | ON | — | — | 5/8 |
| — | ON | — | — | — | 6/8 |
| ON | ON | — | — | — | 7/8 |
| ON | — | — | — | — | 8/8 |

In Table 5, "0/8" means that no pitch control should be initiated, while "8/8" means that the pitch control as specified in the pitch control table should be initiated 100%.

If no tablet event is detected in step S13, the tablet assign process will be skipped.

Then, a key scan process is performed (step S15). In this process, the key scan circuit 13 scans the key switch matrix 12 and fetches data of the depression statuses of the key switches to the CPU 17.

Then, the fetched data is analyzed to check if there is any key event (step S16). When it is judged that a key event has occurred, a key assign process is performed (step 17). In this process, a process associated with the key ON/OFF event is executed. This is, the values of the ON/OFF event is executed. That is, the values of the ON/OFF, key code, velocity and tone (pitch TBL in some cases) of the assignment memory A are set, the values of the ON/OFF, key code and velocity of the assignment memory B are set.

Then, a tone-ON frequency setting process is performed (step S18) where the OCT and F number are computed and set in the assignment memory B, though its details will be given later.

When it is judged in step S16 that no key event has occurred, the key assign process as well as the tone-0N frequency setting process will be skipped.

Then, the contents for the MIDI I/O buffer are processed (step S19). This is a tone-ON control process based on the MIDI input. When processing the contents of the MIDI I/O buffer is completed, the flow returns to step S12 and the above-described sequence of processes will be repeated.

Figure 10A:
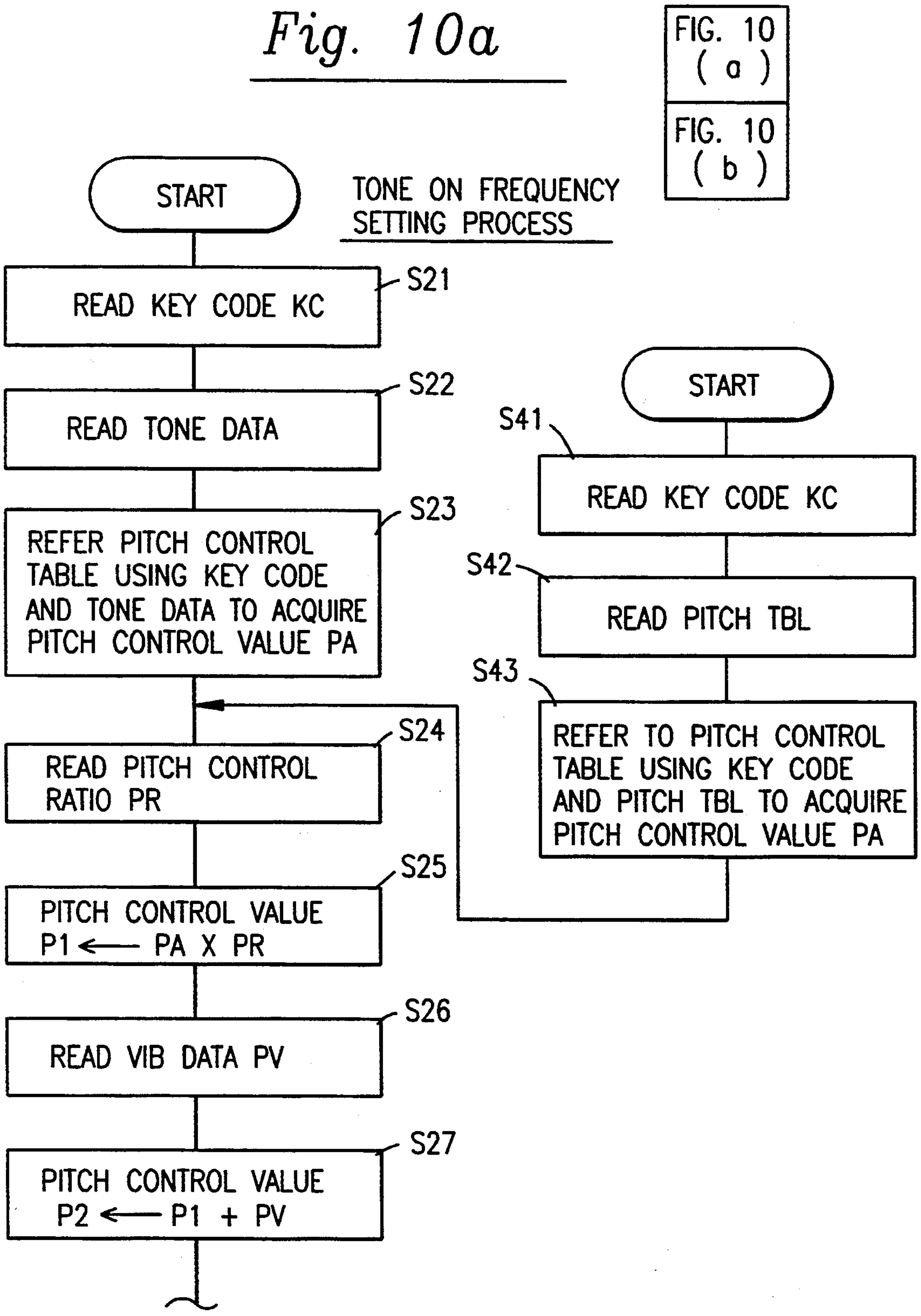
Figure 10B:
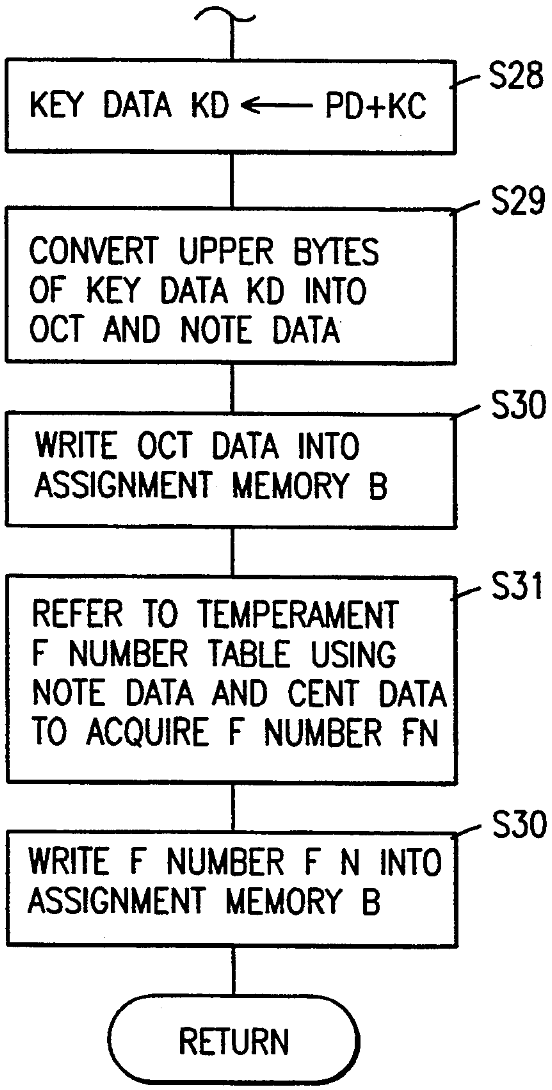

FIG. 10 presents a detailed flowchart illustrating the operation of the tone-ON frequency setting process.

To begin with, the key code of a channel that is to initiate tone generation is read out from the assignment memory A (step S21). Then, tone data is likewise read out (step S22).

Then, the pitch control table (see FIG. 7) is referred to using the read key code and tone data, thus providing a pitch control value PA (step S23). The pitch control value PA to be acquired is 8-bit data affixed with a sign, and falls within the range of $$0 \text{ to } +7F_H(+127/128\times 100 \text{ cent}) \quad (2)$$

Then, the pitch control ratio PR is read out (step S24). This pitch control ratio PR is ratio data acquired in the tablet assign process (step S!$) in the main routine. The pitch control ratio PR is one of the following values:

$$0/8, \tfrac{1}{8} \ldots, \tfrac{7}{8}, \text{ and } 8/8 \quad \ldots (3).$$

The pitch control value PA is multiplied by the pitch control ratio PR to become a new pitch control value P1 (step S25). That is, $$P1 = PA \times PR \quad (4)$$

P1 therefore falls within the range of:

$$0 \text{ to } +7F_H(+127/128\times 100 \text{ cent}) \quad (5)$$

When the pitch control value need not be changed, the above steps S24 and S25 can be omitted.

Then, VIB data PV of the channel which is to initiate tone generation is read out (step S26). The VIB data PV to be read out here is sign-affixed 8-bit data which falls within the range of $$0 \text{ to } +7F_H(+127/128\times 100 \text{ cent}) \quad (6)$$

The pitch control value P1 acquired by equation (4) and the VIB data PV are added together to produce a new pitch control value P2 (step S27). That is, $$P2 = P1 + PV \quad (7)$$

P2 therefore falls within the range of:

$$0 \text{ to } +FE_H(+254/128\times 100 \text{ cents}) \quad (8)$$

When no vibrato needs to be added, the above steps S26 and S27 are unnecessary.

Then, the pitch control value P2 and the key code KC are added together to produce key data KD (step S28). That is, $$KD = P2 + KC \quad (9)$$

Figure 12A:
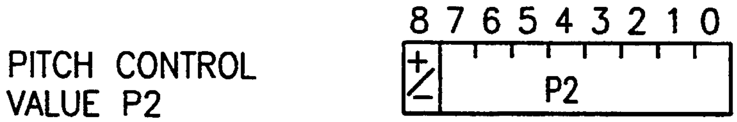
FIGS. 12A to 12F are explanatory diagrams for explaining the operation of the present invention.
Figure 12B:
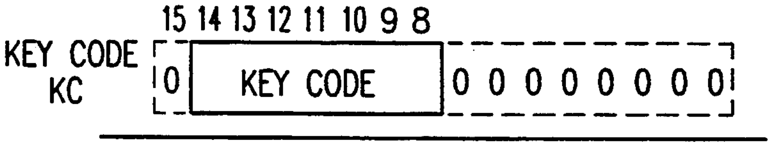
Figure 12C:
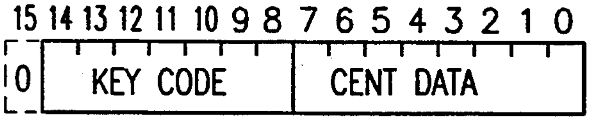

In this addition, the lower 8 bits (/0/to/FE/) of the pitch control value P2 excluding the sign is added to a value resulting from 8-bit shifting of a 7-bit key code to the left (the lower bits being zero), as shown in FIGS. 12A to 12C.

Figure 12D:
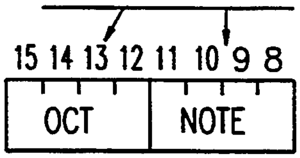

The upper byte of the resultant key data KD is converted into OCT data and note data as shown in FIG. 12D (step S29).

Then, the acquired OCT data is written into the assignment memory B (step S30).

Figure 12E:
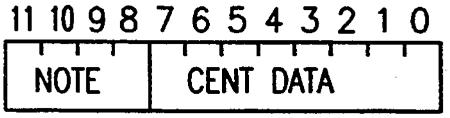
Figure 12F:
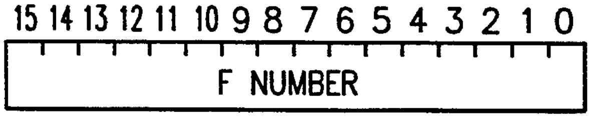

The temperament F number table is then referred to using the note data and cent data (see FIG. 12E) to acquire an F number FN as shown in FIG. 12F (step S31). The acquired F number FN is written in the assignment memory B (step S32), and this subroutine is terminated to return to the main routine. This completes the tone-ON frequency setting process.

In the case where the pitch control value PA is obtained using the pitch table, first, the key code of the channel which is to initiate tone generation is read out (step S41) as shown in FIG. 10. Then, the pitch TBL of that channel is read out (step S42), and the pitch control table is referred to using the key switch matrix and pitch TBL to acquire the pitch control value PA (step S43). The flow then returns to step S24 to execute the same sequence of processes as described previously. (As this process sequence has already been described, its description will not be repeated.)

In short, the present invention can provide a tone generating apparatus capable of effecting independent pitch control for every key in accordance with the timbre even with a small scale of hardware.

This invention can also provide a tone generating apparatus capable of executing independent pitch control for every key in accordance with the timbre and modulating the tone frequency.

This invention can further provide a tone generating apparatus capable of altering the degree of pitch control for every key in accordance with the timbre or timbre parts, thus ensuring finer pitch control.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention described, and all statements of the scope of the invention which, as a matter of language, might be said to fall therebetween.

What is claimed is:

1. An electronic musical instrument having plural keys and having independent pitch control for every key of said instrument, comprising:

frequency control data storage means for storing frequency control data;

said frequency control data being stored for only one temperament, said one temperament being equal temperament;

said frequency control data being stored at intervals smaller than half tones;

pitch control information storage means for storing, for each key code, pitch control information including the pitch difference between said equal temperament and a temperament other than said equal temperament;

timbre designating means for designating a timbre;

key code generating means for generating a key code at a designated pitch; and temperament designating means for designating a temperament corresponding to a timbre designated by said timbre designating means;

whereby, based on pitch control information corresponding to said designated temperament and to said designated key code, said frequency control data is read out to determine a tone-ON frequency;

whereby the amount of frequency control data required to produce a musical tone is equal to the sum of the number of keys multiplied by the number of intervals and the number of keys multiplied by the number of temperaments; and whereby musical effects such as vibrato and glide may be achieved with relatively small data storage requirements.

2. The instrument of claim 1, wherein said pitch control information includes pitch control information for key codes in a predetermined key range, and wherein said control means uses said pitch control information when a tone-ON instruction is for a key within said predetermined key range to determine a tone frequency, and uses pitch control information for a specific key code to determine said tone frequency when said tone-ON instruction is for a key outside said predetermined key range.

3. The instrument of claim 1, wherein said pitch control information includes single pitch control information for multiple key codes, and wherein said control means uses said pitch control information corresponding to each key code to determine a tone frequency.

4. The instrument of claim 1, wherein said pitch control information includes single pitch control information for multiple key codes, and wherein said control means computes, by interpolation, pitch control information for each key code for which tone generation is instructed and uses said computed pitch control information to determine a tone frequency.

5. The instrument of claim 1, wherein said control means refers to a pitch information table previously prepared according to a predetermined pitch, using said pitch control information and note information included in said key code, thereby determining a tone frequency.

6. An electronic musical instrument having plural keys and having independent pitch control for every key of said instrument, comprising:

frequency control data storage means for storing frequency control data;

said frequency control data being stored for only one temperament, said one temperament being equal temperament;

said frequency control data being stored at intervals smaller than half tones;

frequency modulating means for designating modulation of a tone-ON frequency according to pitch modulation data;

timbre designating means for designating a timbre;

key code generating means for generating a key code at a predetermined pitch; and temperament designating means for designating a temperament corresponding to a timbre designated by said timbre designating means;

whereby, based on said pitch control information corresponding to said designated temperament and to said designated key code, said frequency control data is read out to determine a tone-ON frequency.

7. The instrument of claim 6, wherein said modulation of a tone frequency designated by said modulation designating means is modulation for adding vibrato.

8. The instrument of claim 6, wherein said pitch control information includes pitch control information for key codes in a predetermined key range, and wherein said control means uses said pitch control information when a tone-ON instruction is for a key within said predetermined key range to determine a tone frequency, and uses pitch control information for a specific key code to determine said tone frequency when said tone-ON instruction is for a key outside said predetermined key range.

9. The instrument of claim 6, wherein said pitch control information includes single pitch control information for multiple key codes, and wherein said control means uses said pitch control information corresponding to each key code to determine a tone frequency.

10. The instrument according to claim 6, wherein said pitch control information includes single pitch control information for multiple key codes, and wherein said control means computes, by interpolation, pitch control information for each key code for which tone generation is instructed and uses said computed pitch control information to determine a tone frequency.

11. The instrument of claim 6, wherein said control means refers to a pitch information table previously prepared according to a predetermined pitch, using said pitch control information and note information included in said key code, thereby determining a tone frequency.

12. An electronic musical instrument having plural keys and having independent pitch control for every key of said instrument, comprising:

frequency control data storage means for storing frequency control data;

said frequency control data being stored for only one temperament, said one temperament being equal temperament;

said frequency control data being stored at intervals smaller than half tones;

pitch control information storage means for storing, for each key code, the pitch difference between said equal temperament and a temperament other than said equal temperament;

pitch designating means for designating said pitch control information to be arithmetically combined with the pitch control information stored in said pitch control information storage means;

timbre designating means for designating a timbre;

key code generating means for generating a key code at a predetermined pitch; and temperament designating means for designating a temperament corresponding to a timbre designated by said timbre designating means;

whereby, based on said pitch control information corresponding to said designated temperament and to said designated key code, said frequency control data is read out to determine tone-ON frequency.

13. The instrument of claim 12, wherein said pitch control designation means is a switch provided on an operation panel.

14. The apparatus according to claim 12, wherein said pitch control information includes pitch control information for key codes in a predetermined key range, and wherein said control means uses said pitch control information when a tone-ON instruction is for a key within said predetermined key range to determine a tone frequency, and uses pitch control information for a specific key code to determine said tone frequency when said tone-ON instruction is for a key outside said predetermined key range.

15. The instrument according to claim 12, wherein said pitch control information includes single pitch control information for multiple key codes, and wherein said control means uses said pitch control information corresponding to each key code to determine a tone frequency.

16. The instrument according to claim 12, wherein said pitch control information includes single pitch control information for multiple key codes, and wherein said control means computes, by interpolation, pitch control information for each key code for which tone generation is instructed and uses said computed pitch control information to determine a tone frequency.

17. The instrument of claim 12, wherein said control means refers to a pitch information table previously prepared according to a predetermined pitch, using said pitch control information and note information included in said key code, thereby determining a tone frequency.

* * * * *